United States Patent

[11] 3,619,541

[72] Inventor Heinz Webers
Osterath, Germany
[21] Appl. No. 27,335
[22] Filed Apr. 10, 1970
[45] Patented Nov. 9, 1971
[73] Assignee Bau-Stahlgewebe GmbH
Dusseldorf-Oberkassel, Germany
[32] Priority Apr. 12, 1969
[33] Germany
[31] P 19 18 601.7

[54] APPARATUS FOR THE WELDING OF GRID STRUCTURES COMPOSED OF INTERSECTING LONGITUDINAL AND TRANSVERSE RODS
4 Claims, 6 Drawing Figs.

[52] U.S. Cl. .............................................. 219/56,
219/58, 140/112
[51] Int. Cl. ...................................................... B23k 11/00
[50] Field of Search ............................................ 219/56, 57,
58; 140/112

[56] References Cited
UNITED STATES PATENTS
2,810,817 10/1957 Brehms et al. ................ 219/56 X 3,194,935 7/1965 Stoeckel ........................ 219/56
Primary Examiner—J. V. Truhe
Assistant Examiner—Hugh D. Jaeger
Attorney—Greene & Durr ABSTRACT: Apparatus for spot welding the intersection points of grids composed of sets of parallel longitudinal and transverse rods comprises double action vertically reciprocable, movable, welding beam carrying aligned upper and lower welding electrodes spaced by distances equal to the spacing distance of the longitudinal rods and a pair of upper and lower stationary welding beams carrying cooperating electrodes aligned with the electrodes of the movable beam, for the welding of a pair of grids fed in different horizontal planes in the direction of the longitudinal rods between each pair of cooperating stationary and movable welding electrodes. The grids are fed intermittently at the rhythm of the welding operations from one to the next welding position by distances equal to the spacing distance of the transverse rods, the arrangement being such as to feed one grid during the welding of the other grid, and vice versa, by means of a pair of gripping and feeding devices operated in phase opposition in the direction parallel to the longitudinal rods.

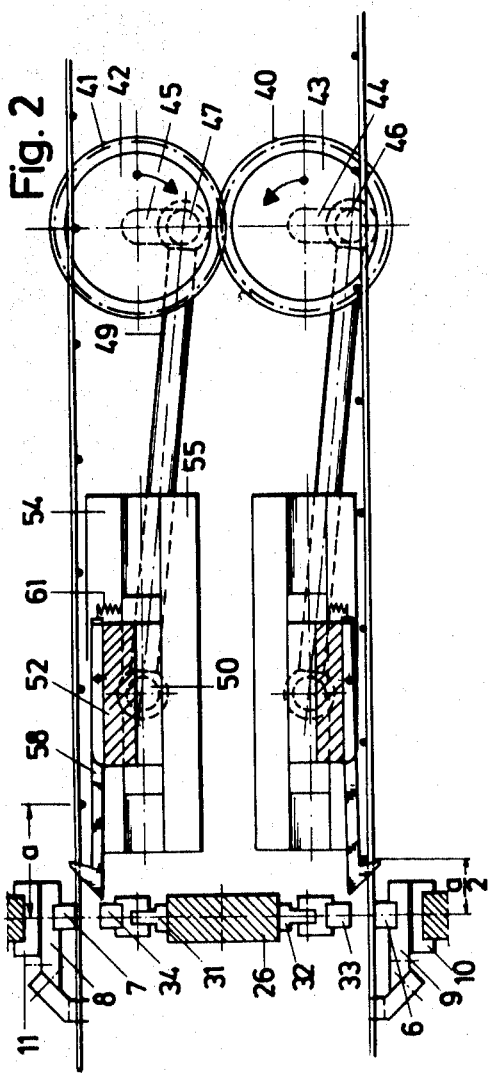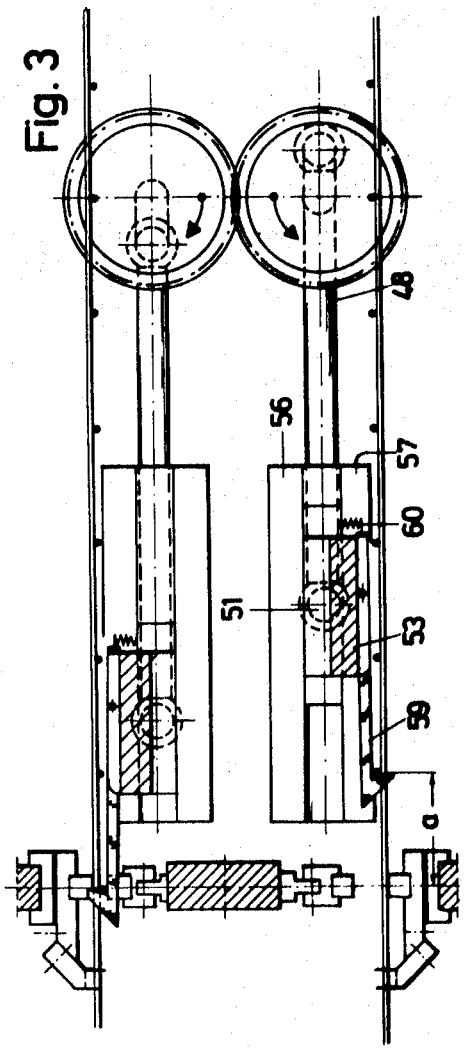

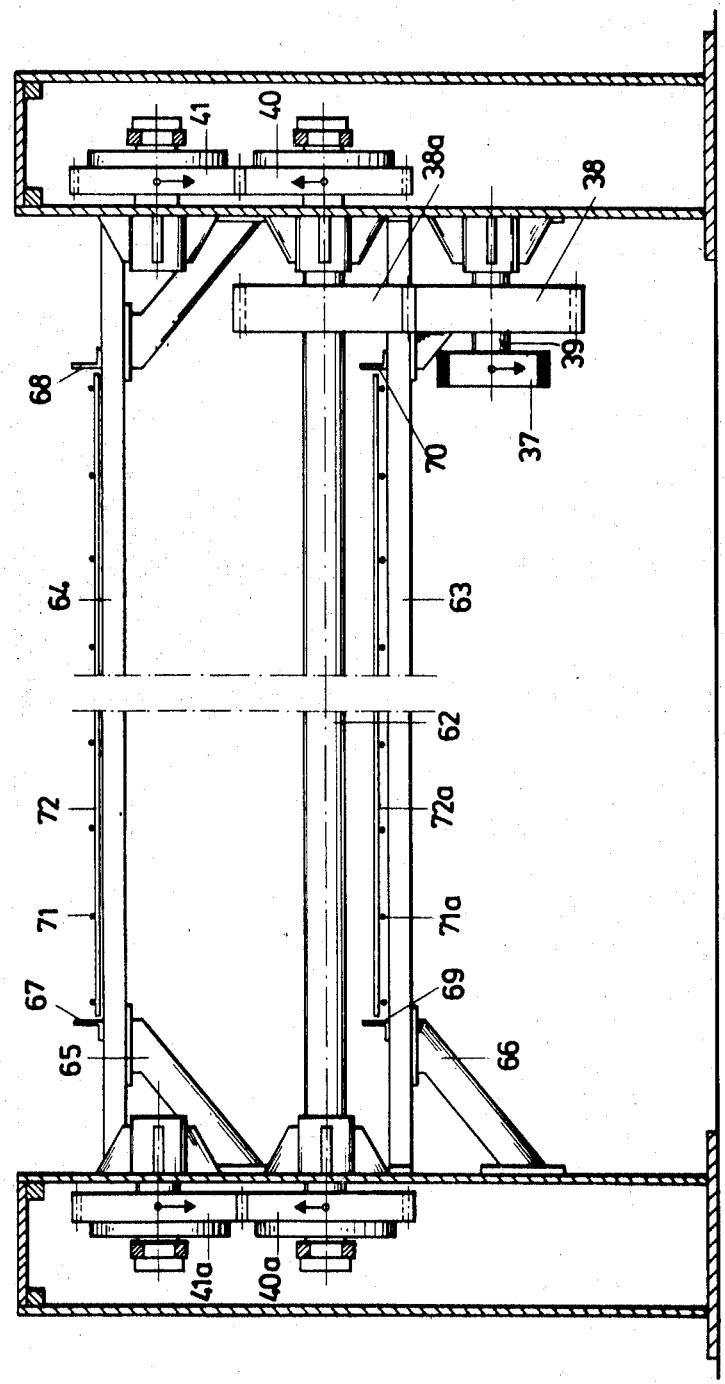

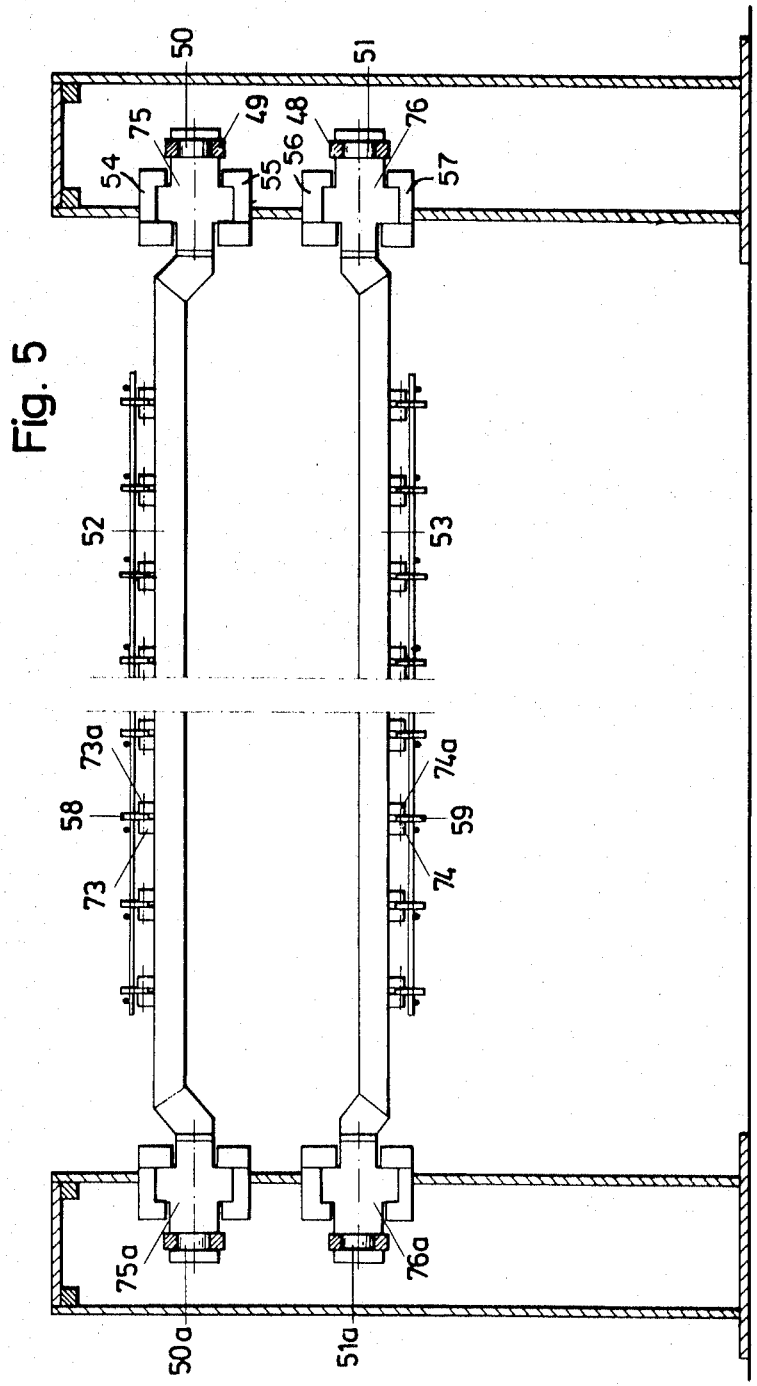

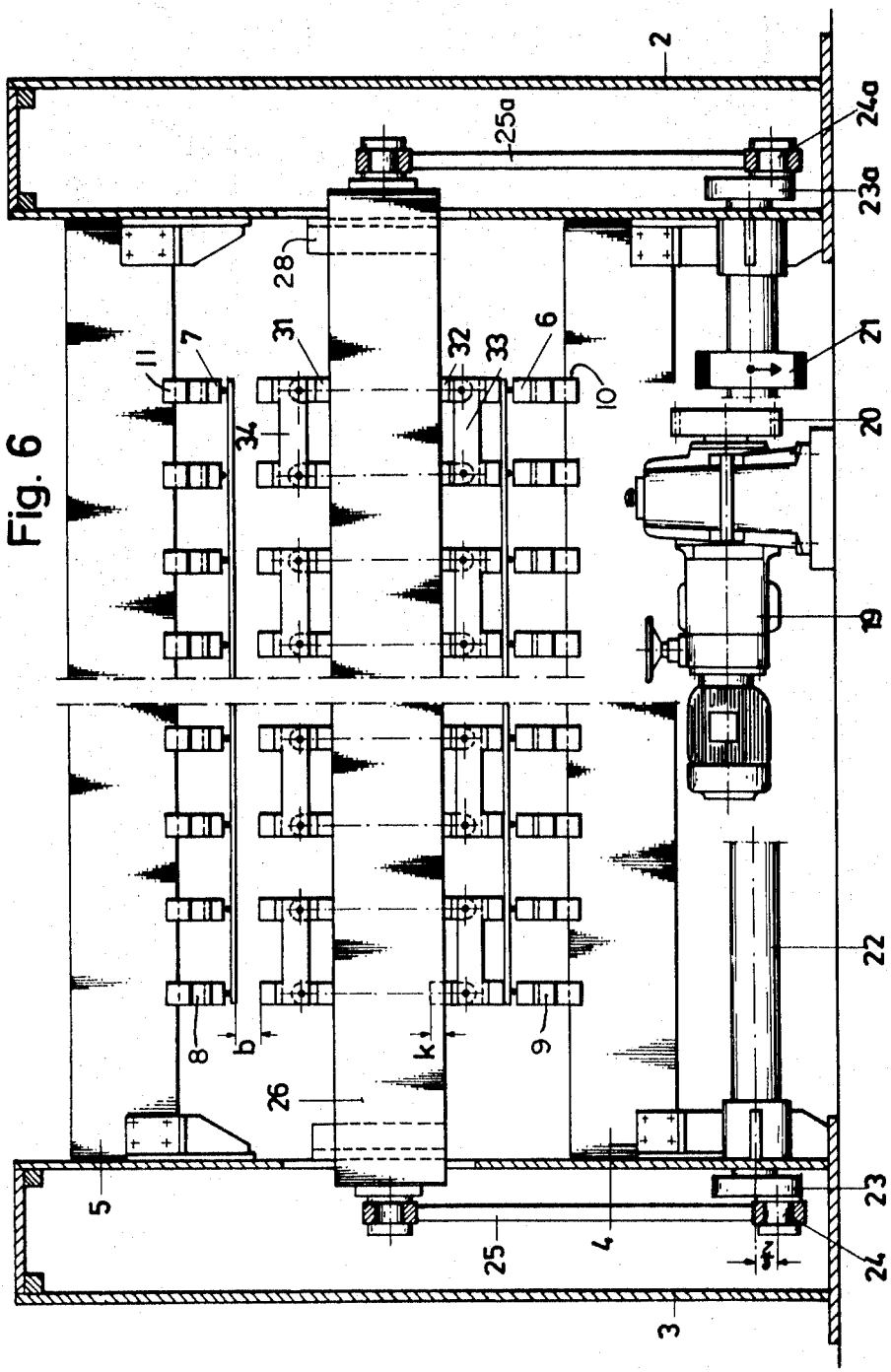

APPARATUS FOR THE WELDING OF GRID STRUCTURES COMPOSED OF INTERSECTING LONGITUDINAL AND TRANSVERSE RODS

The present invention relates to apparatus for and a method of spot welding the intersection points of grid structures of the type composed of intersecting sets of spaced and parallel longitudinal and transverse bars or rods, more particularly to a welding machine of the type comprising a vertically reciprocable movable welding beam fitted with an array of welding electrodes spaced by distances equal to the spacing distance of the longitudinal rods and cooperating with an array of aligned stationary electrodes, with the grid to be welded being fed intermittently between the cooperating electrodes, at the rhythm of the welding operations, by spacing distances equal to the spacing distance of the transverse rods. Multiple-spot welding machines of this type enable a simple and economical fabrication of the grids by successive welding of the transverse rods to the prealigned and intermittently fed longitudinal rods. Grids or mats consisting of steel bars made in this manner find extensive use in the reinforcement of planar concrete parts or structures, such as plates, slabs, floors, etc.

In known multiple-spot grid welding machines, the longitudinal rods, in the case of continuously operating devices, are either fed from a number of supply rolls or applied in precut lengths and welded, at the operating rhythm of the machines, to the transverse rods fed either individually to the welding position or preassembled with the longitudinal rods. Welding of the intersections points is by electric resistance welding by means of the two arrays of electrodes at least one of which is movable, to produce the required welding pressure. Ordinarily, the upper electrodes are movable, their lifting and lowering being effected by reciprocation of the welding beam supporting the movable electrodes and extending across the entire width of the machine. Reciprocation of the beam is effected at the rhythm of the welding operations in a vertical direction, to enable gripping of the welded transverse rods and feeding of the grids by one mesh width, on the one hand, and to enable the introduction of new transverse rods to be welded, on the other hand.

An important object of the present invention is the provision of an improved welding machine for and method of fabricating grid structures of the referred to type, in particular steel grids or mats for use as reinforcing means in concrete construction work, to substantially increase the efficiency and output of the machine compared with conventional grid welding apparatus of comparable size or dimension.

Another object of the invention is the provision of a grid welding machine of the referred to type, wherein pairs of welded grids are supplied by the output of the machine in proper relative position, to enable a direct stacking of the grids in a minimum space without the use of special reversing devices.

The invention, both as to the foregoing and other ancillary objects as well as novel aspects thereof, will be better understood from the following detailed description, taken in conjunction with the accompanying drawings forming part of this disclosure and in which:

FIG. 2 is a fragmentary view of FIG. 1, showing the position at the end of the first quarter of the operating cycle following the position of FIG. 1;

FIG. 3 is a further fragmentary view showing the position midway within the operating cycle following the position of FIG. 1;

FIG. 4 is a side view of the drive mechanism;

FIG. 5 is a side view more clearly showing the feed and gripping devices, and

FIG. 6 is a transverse sectional view of the grid welding machine of FIG. 1 taken across the welding plane.

Like reference numbers denote like parts throughout the different views of the drawings.

Figure 1:
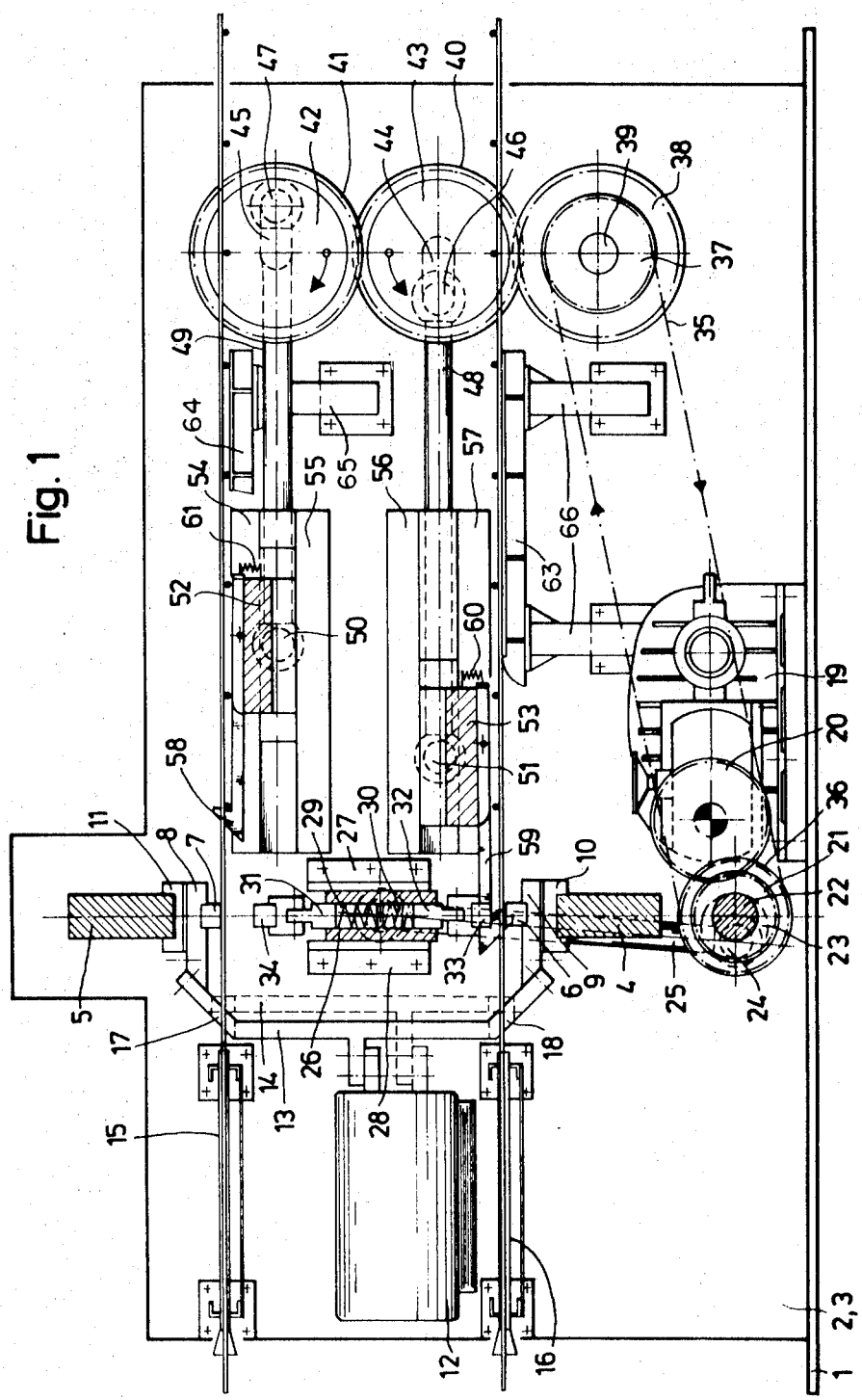
FIG. 1 is a longitudinal cross-sectional view of a grid welding machine constructed in accordance with the principles of the invention, the operating parts being shown in the position after feeding of the upper grid and welding of the lower grid.

With the foregoing objects in view, the invention consists generally in the provision of a multiple-spot grid welding machine of the referred to type involving the feeding to and fabrication by the machine of two grids disposed in different horizontal planes and welded by means of a common vertically reciprocable welding beam arranged between the grids and fitted with aligned upper and lower welding electrodes, in such a manner as to weld one of said grids in the upper dead center position of the beam and to weld the other grid in the lower dead center position of the beam during a full operating cycle of the beam.

Advantageously, the two grids are fed alternately at the operating rhythm of the machine, whereby the first grid is fed by a distance equal to the spacing distance of the transverse rods and the second grid welded during one operating half-cycle and vice versa, the second grid is fed and the first grid welded during the remaining operating half-cycle of the machine.

A major advantage of the new welding machine and method according to the invention is due to the fact that there is utilized both the up and down operating stroke of movable welding beam by the provision of a pair of cooperating upper and lower stationary welding beams fitted with electrodes aligned with the electrodes of the movable welding beam, in such a manner as to enable the alternate welding of a pair of grids by the aid of relatively simple mechanism and doubling of the output, compared with a conventional machine of comparable size or dimension.

In the operation of the welding machine according to the present invention, it is furthermore advantageous to arrange the transverse rods of the upper grid below the longitudinal rods and to arrange the transverse rods of the lower grid above the longitudinal rods. An advantage of such a mirror image arrangement of the grids is the emergence of the two welded grids from the machine in a proper relative position to one another, to enable a direct stacking of the grids within a minimum space, without the usual reversal of alternate grids to be stacked.

Another advantage of a grid welding machine, according to the invention, is the fact that the secondary winding of the welding transformer may be connected to the upper and lower stationary welding electrodes, to enable operation of the movable electrodes at ground potential. Alternatively, the double-action movable welding beam allows the welding transformer to be connected in parallel to both sets of cooperating welding electrodes. In either case, the alternate welding of the grids makes it possible to dispense with an increase of the electric power and control devices required for the welding of two grids, compared with conventional machines utilizing a single-action movable welding beam.

In brief, the grid welding machine, according to the present invention, utilizes a single double-action movable welding beam for alternate welding of a pair of grids, substantially without increase of the electric welding power, while dispensing in a simple manner with special reversing means, where the welded grids are to be assembled into a stack occupying a minimum space, as will become further apparent as the description proceeds in reference to the drawings.

FIG. 1 being a longitudinal cross section through a welding machine made according to the invention, comprises a baseplate 1 from which extend a pair of sidewalls or uprights 2 and 3 more clearly shown in FIG. 6. Fixedly mounted in the uprights 2 and 3 are the lower and upper stationary welding beams 4 and 5 which carry arrays of welding electrodes comprised respectively of electrode elements 6 and 7 mounted upon holders 9 and 8 which are in turn supported by feet or supports 10 and 11 mounted upon the beams 4 and 5.

A pair of juxtaposed connecting bridges 13 and 14 serve to electrically connect the output terminals of the secondary winding of the welding transformer 12 with the upper and lower stationary electrode arrays. In the drawing, the bridge 14 is shown in dashed lines and displaced laterally relative to the bridge 13 for the sake of better illustration. In order to feed the longitudinal rods of the grids to be welded in line with the input guide tubes 15 and 16, the bridges 13 and 14 are provided with suitable guide slots 17 and 18, respectively.

The drive source or mechanism 19 operates, via a pair of interengaging driving gears 20 and 21, the main drive shaft 22 supported by uprights 2 and 3. The movable intermediate welding beam 26 disposed between the stationary beams 4 and 5 is reciprocated in the vertical direction at right angle to the grids to be welded by means of a pair of disks 23 and 23a secured to the opposite ends of shaft 22 and carrying eccentric bolts 24 and 24a linked with connecting rods 25a operably connecting the disks 23, 23a with the beam 26 on either side of the machine. Two guide plates or the like 27 and 28 ensure a close vertical guidance and operation of the beam 26, while a pair of compression springs 29 and 30 and plungers 31 and 32 serve to produce the required welding pressure via the movable electrode bridges 33 and 34, respectively, carried by the beam 26 and aligned with the stationary electrodes 6 and 7 of the beams 4 and 5.

The double-action grid feeding mechanism comprises essentially a drive chain 35 cooperating with a pair of chain wheels 36 and 37, the former of which is carried by the shaft 22, while the latter is secured to an intermediate shaft 39, FIG. 4, carrying a gear 38 which meshes with a further gear 38a. Gear 38a drives, via a further shaft 62, a pair of gears 40 and 40a which in turn mesh respectively with a pair of gears 41 and 41a. Mounted upon the gears 40 and 41 are a pair of crank disks 42 and 43, FIG. 1, having guide slots 44 and 45 which serve to operate, via eccentric bolts 46 and 47, a pair of connecting rods 48 and 49, respectively. The bolts 46 and 47 may be adjusted in relation to the guide slots 44 and 45 by well-known means (not shown), to result in the proper operation of the grid feed devices in relation to each other, on the one hand, and to the movable welding beam, on the other hand.

The connecting rods 48 and 49 are linked respectively to bolts 50 and 51 of a pair of slidable carriers 52 and 53 of the gripping devices, to effect the horizontal feed movement of the grids described in the following. For this purpose, the carriers 52 and 53 are guided in the horizontal direction by pairs of lateral guides 54, 55 and 56, 57 disposed respectively within the uprights 2 and 3, FIG. 5, whereby the arrays of gripping devices 58 and 59 mounted upon said carriers engage the respective last welded transverse rods at the end of each half of an operating cycle, to advance the respective grid by a single mesh width. The gripping devices 58 and 59 being pivotally mounted upon the carriers 52 and 53 are held in proper operating position by means of return springs 60 and 61, respectively schematically indicated in the drawing.

While the operation of the carriers 52 and 53 via one pair of connecting rods and eccentric bolts 50 and 51 disposed on one side of the machine has been described in the foregoing, the same operation applies to the connecting rods and bolts 50a and 51a disposed on the opposite side of the machine, FIG. 5.

In the position of the gripping devices as shown in FIG. 1, the feed of the upper grid has been completed and the lower gripping devices have just engaged the last welded lower transverse rod.

FIG. 2 shows an intermediate position in which the lower gripping devices have advanced the lower grid by one-half or a2 of the total operating stroke a and the upper gripping devices have completed one-half or a2 of their return stroke.

FIG. 3 shows the end position of the lower gripping devices upon completion of the full operating stroke at which time the upper gripping devices have engaged the last welded upper transverse rod. The operation of the devices is then completed in the opposite direction during the remainder of the operating cycle, with the upper gripping device feeding the upper grid, and with the lower gripping device carrying out its return stroke, to restore the position shown by FIG. 1.

FIG. 4, showing a transverse section through the uprights 2 and 3 more clearly illustrates the driving mechanism for the two feeding devices, comprising the chainwheel 37 driving, via gear pair 38 and 38a and intermediate shaft 22, the two gears 40 and 40a disposed respectively within the uprights 2 and 3 and meshing with gears 41 and 41a, in the manner described hereinbefore. FIG. 4 furthermore shows the supporting plates 63 and 64 for the grids mounted upon brackets 65 and 66 and fitted with lateral guide rails 67, 68, 69 and 70 for the grids composed of longitudinal rods 71, 71a and transverse rods 72, 72a.

FIG. 5 shows a front view of the gripping devices 58 and 59 supported in the guides or bearings 73, 73a and 74, 74a, respectively. The carriers 52 and 53 being supported by slides 75, 75a and 76, 76a carry the connecting rod bolts 50, 50a and 51, 51a, respectively, the eyes of the rods 48 and 49 being indicated in section in the drawing.

FIG. 6 is a section through the machine taken across one of the welding planes or set of cooperating electrodes 6, 7, 33, 34 and showing the movable welding beam 26 in the lower operating position with the connecting rods 25 and 25a passing through the lower dead center positions of the eccentric stroke e determining the operating stroke of the beam 26 comprised of the actual lift stroke b and the compression stroke k, the latter representing the compression the springs 29 and 30, FIG. 1. Eccentric disks 23 and 23a carrying the bolts 24 and 24a are fixedly secured to the shaft 22 driven, via gear 30, by the source 19, in the manner described hereinbefore.

While a mechanical control of both the welding beam 26 and feeding devices 52, 58 and 53, 59 has been shown and described in the foregoing, it is understood that the control may be by different and equivalent means, such for instance as in the form of pneumatic or hydraulic devices controlled for mutual operation in the manner according to the invention. The mechanical control as shown and described herein has the advantage of enabling a fully integrated operation of the welding beam and feeding devices in a relatively simple and secure manner.

In the foregoing, the invention has been described in reference to a specific exemplary device. It will be evident that variations and modifications, as well as the substitution of equivalent parts and devices for those shown, may be made without departing from the broader scope and spirit of the invention.

I claim:

1. Apparatus for spotwelding the intersections of grids composed of sets of superposed parallel longitudinal and transverse rods comprising in combination:
    1. a vertically reciprocable movable welding beam carrying arrays of aligned lower and upper welding electrodes spaced by distances equal to the spacing distance of said longitudinal rods,
    2. a pair of cooperating lower and upper stationary welding beams disposed on either side of said movable welding beam and carrying arrays of cooperating welding electrodes aligned with the electrodes of said movable welding beam,
    3. means to intermittently feed, by the distance equal to the spacing distance of said transverse rods, a pair of lower and upper grids to be welded which are disposed in different horizontal planes and which are respectively between cooperating electrode pairs of said movable welding beam and the adjoining stationary welding beam,
    4. means to reciprocate said reciprocable moving welding beam so as to alternately engage (1) the lower grid between the electrodes of the lower stationary welding beam and the lower electrodes of said movable welding beam and (2) the upper grid between the electrodes of the upper stationary electrode and the upper electrodes of said movable welding beam, and means to supply power to the upper electrodes of said movable beam only when in the upper position and to supply power to the lower electrodes only when in their lower position, 5. said means to intermittently feed the upper and lower grids being constructed and arranged to feed the lower grid while a transverse rod is being welded to the upper grid and vice versa.

2. Grid welding apparatus as claimed in claim 1, including a welding transformer, and means connecting the secondary terminals of said transformer each to the electrodes of said stationary welding beams whereby the movable electrode can be operated at ground potential.

3. Apparatus for spotwelding the intersections of grids composed of sets of superposed parallel longitudinal and transverse rods comprising in combination:
  1. a frame including a base and a pair of uprights extending from opposite sides of said base,
  2. a movable welding beam vertically reciprocably mounted in said uprights and carrying arrays of aligned lower and upper welding electrodes spaced by distances equal to the spacing distance of said longitudinal rods,
  3. a pair of cooperating lower and upper stationary welding beams fixedly supported by said uprights on either side of said movable welding beam and carrying arrays of cooperating welding electrodes aligned with the electrodes of said movable welding beam,
  4. means to support a pair of grids to be welded in different horizontal planes on either side of said movable welding beam and between the latter and the adjoining stationary welding beams.
  5. a first and second horizontally reciprocable grid feeding means operative upon the last welded transverse rod of each of said grids, to intermittently feed said grids in the direction of said longitudinal rods and by distances equal to the spacing distance of said transverse rods,
  6. a common drive source,
  7. first motion-transmitting means operably connecting said source with said movable welding beam, and
  8. second and third motion-transmitting means operably connecting said source respectively with said first and said second feeding means,
  9. whereby to enable alternate and consecutive welding of the transverse rods to the horizontal rods of said grids during respectively the upward and downward operating strokes of said movable welding beam.

4. Grid welding apparatus as claimed in claim 3, said first, second and third motion-transmitting means being mutually correlated to alternately feed said grids and to weld one grid during the feeding of the other grid, and vice versa.

* * * * *